(12) United States Patent
Lemma

(10) Patent No.: US 9,203,282 B2
(45) Date of Patent: Dec. 1, 2015

(54) COOLING SUPPORT ELEMENT FOR A STATOR SEGMENT OF AN ELECTRICAL MACHINE FOR A WIND TURBINE

(71) Applicant: Edom Lemma, Brande (DK)

(72) Inventor: Edom Lemma, Brande (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 351 days.

(21) Appl. No.: 13/870,336

(22) Filed: Apr. 25, 2013

(65) Prior Publication Data

US 2013/0285489 A1    Oct. 31, 2013

(30) Foreign Application Priority Data

Apr. 26, 2012 (EP) .................................... 12165757

(51) Int. Cl.
*H02K 9/00* (2006.01)
*F03D 9/00* (2006.01)
*F03D 11/00* (2006.01)
*H02K 15/14* (2006.01)
*H02K 1/18* (2006.01)
*H02K 5/20* (2006.01)
*H02K 9/19* (2006.01)
*H02K 7/18* (2006.01)

(52) U.S. Cl.
CPC .................. *H02K 9/00* (2013.01); *F03D 9/002* (2013.01); *F03D 11/00* (2013.01); *H02K 1/187* (2013.01); *H02K 5/20* (2013.01); *H02K 15/14* (2013.01); *F05B 2260/202* (2013.01); *H02K 7/1838* (2013.01); *H02K 9/19* (2013.01); *Y02E 10/722* (2013.01); *Y02E 10/725* (2013.01); *Y10T 29/49009* (2015.01)

(58) Field of Classification Search
CPC ............. H02K 9/00; H02K 9/16; H02K 9/19; H02K 15/14; H02K 5/18; H02K 5/20
USPC ....................... 310/65, 64, 60 A, 60 R, 58, 52
See application file for complete search history.

(56) References Cited

U.S. PATENT DOCUMENTS 4,469,973 A * 9/1984 Guyot et al. .................... 310/51
5,796,191 A * 8/1998 Schwanda ...................... 310/58

(Continued)

FOREIGN PATENT DOCUMENTS

DE    2917717 A1    11/1980
EP    1988282 A2    11/2008

(Continued)

OTHER PUBLICATIONS

Machine translation of JP 11252830 A (Sep. 1999).*

*Primary Examiner* — Michael Andrews

(57) ABSTRACT

A cooling support element for a stator segment of an electrical machine is provided. The cooling support element has a first and a second plate each having an upper surface and a lower surface. The upper surface of the first plate has anchoring element for anchoring a stator lamination stack attached to the cooling support element. The lower surface of the second plate has an inlet and an outlet opening. The two plates are attached to each other. The lower surface of the first plate faces the upper surface of the second plate. Separator elements are disposed between the lower surface of the first plate and the upper surface of the second plate for providing a cooling channel. A cooling fluid is guidable from the inlet opening through the cooling channel to the outlet opening for dissipating heat from the stator lamination stack.

13 Claims, 7 Drawing Sheets

(56) References Cited

U.S. PATENT DOCUMENTS

2008/0179972 A1* 7/2008 Aoki et al. ............... 310/52
2008/0265585 A1* 10/2008 Torres Martinez ............ 290/55

FOREIGN PATENT DOCUMENTS

EP 2110931 A2 10/2009
JP 11252830 A * 9/1999 ............... H02K 8/15

* cited by examiner

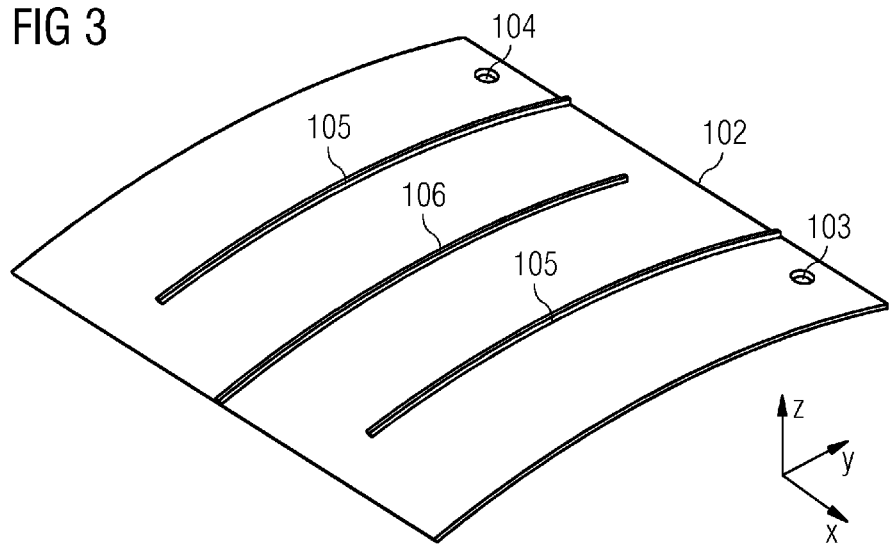
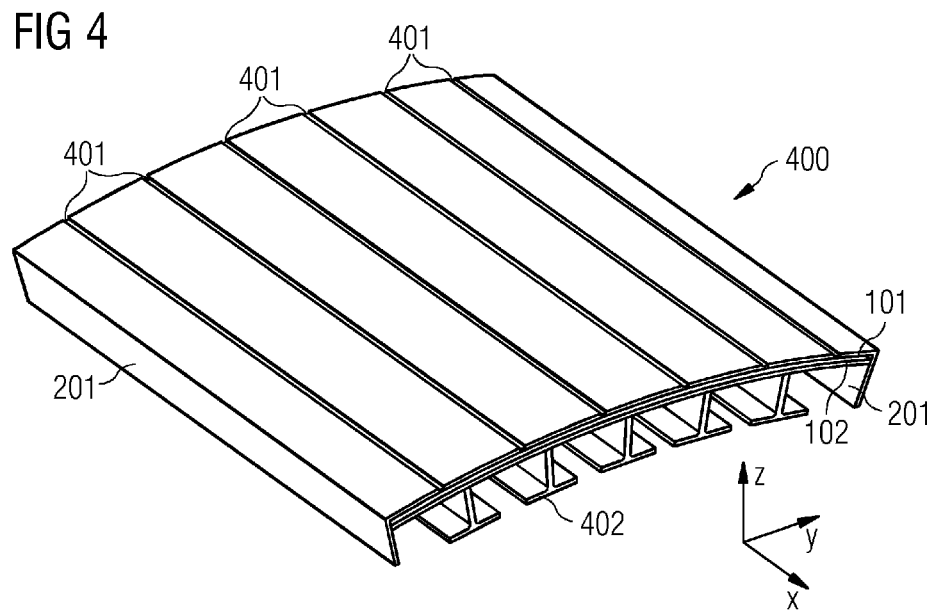

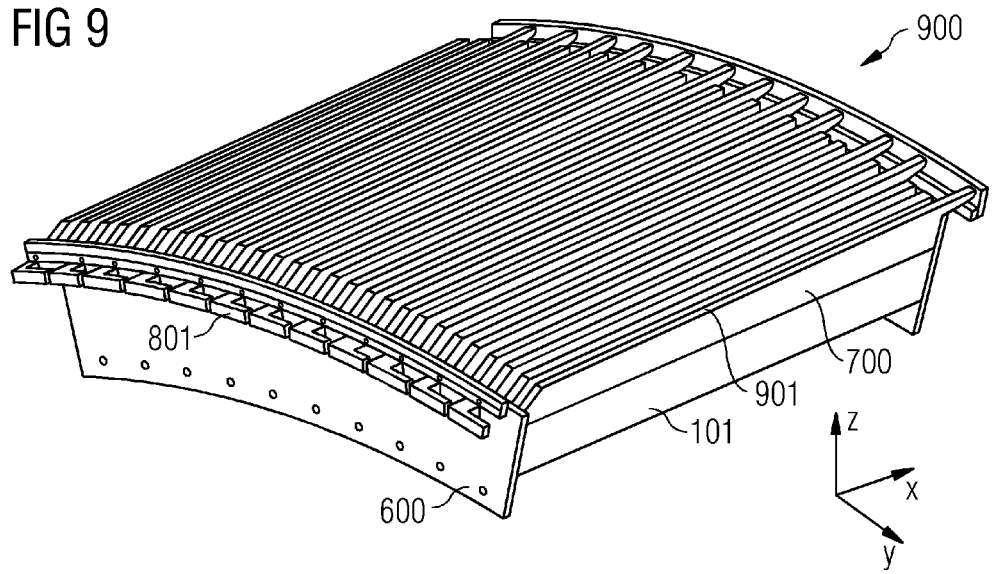
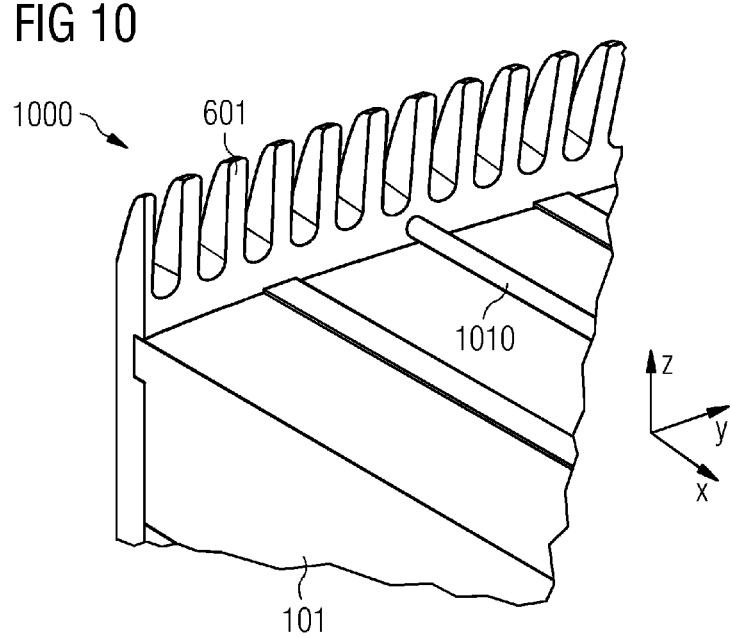

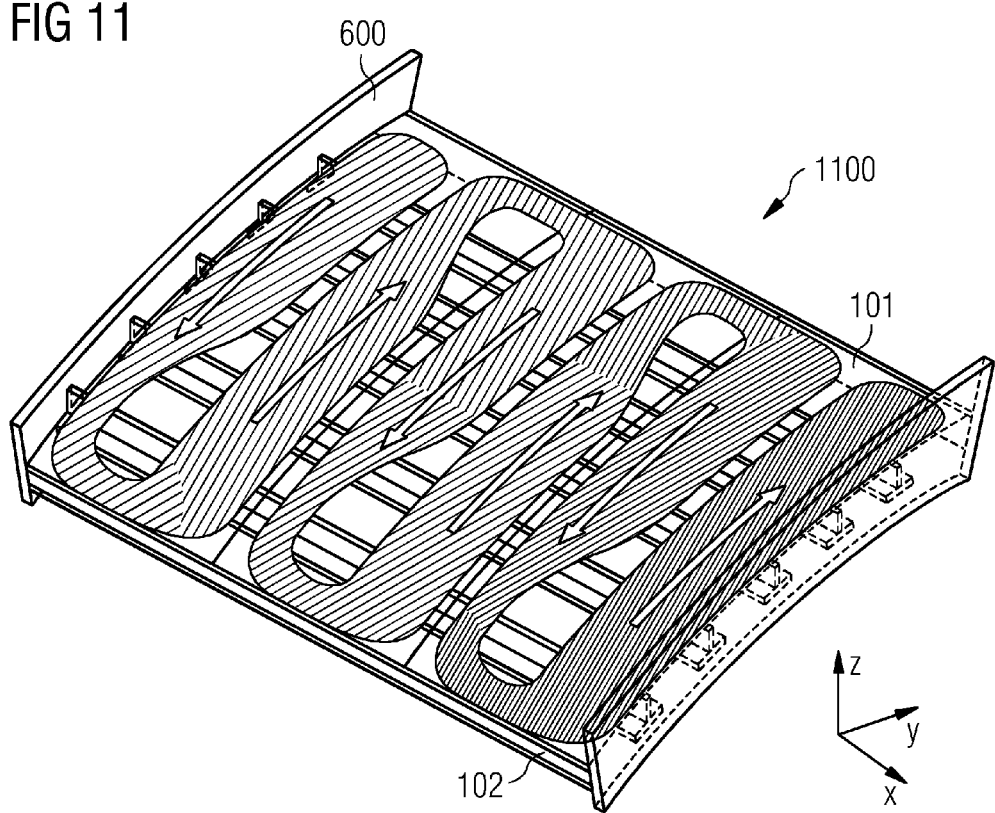

COOLING SUPPORT ELEMENT FOR A STATOR SEGMENT OF AN ELECTRICAL MACHINE FOR A WIND TURBINE

CROSS REFERENCE TO RELATED APPLICATIONS

This application claims priority of European Patent Office application No. 12165757.1 EP filed Apr. 26, 2012, which is incorporated by reference herein in its entirety.

FIELD OF INVENTION

The present invention relates to a cooling support element for a stator segment for a stator of an electrical machine, in particular a generator. Further, the present invention relates to a stator segment comprising such a cooling support element. Furthermore, the present invention relates to a stator comprising the stator segment. Moreover, the present invention relates to an electrical machine comprising the stator, for instance to a generator for a wind turbine. Beyond this, the present invention relates to a method for manufacturing such a cooling support element.

BACKGROUND OF INVENTION

An electrical machine, such as generators for wind turbines, may consist of a rotor and a stator. The stator may be composed of a stack of laminations, wherein one or more coils or windings may be arranged in recesses of the stator lamination stack.

In such electric machines, heat is generated when transferring mechanical energy in to electrical energy and vice versa. The heat is generated in both the copper conductors that form the windings of the stator by Joule losses and the iron parts of magnetically active components by eddy current losses. The generated heat has to be removed in order to avoid hotspots, power reduction due to increased magnet temperature and insulation wearing.

In common systems, the stator lamination stack and the attached windings are cooled by blowing air inside the stator. In axial end sections of the stator housings the windings protrude and form a half loop. The protruding half loops of the windings form the end windings of the stator windings. The stator windings are cooled by blowing air through the windings, for example in an air gap between rotor and stator or through radial extending ducts of the stator housing. The cooling of segments has been undertaken with an air to air heat exchanger that is mounted per segment. As the number of segments increases, the cooling requirements will increase and hence increasing the weight and complexity of the geometry of the stator and the cooling part. The mounting and the air piping will also pose problems for construction, and lifetime of the generator expected may not be fulfilled due to larger service requirement. In such systems, the stator laminations are welded to underlying T bars and fixed at the ends by pressure plates. The stator stack is provided with a number of axial spacers for cooling and hence hereby reducing stiffness of the segments after assembly.

An uneven flow of cooling air may occur in such cooling systems and may cause uneven machine performance regarding temperature and may further require larger fan powers to address hot spots especially in the end windings. In addition, axial cooling channels provided in the stator stack may reduce the structural integrity of the segments.

Thus, there may be a need for an improved system for dissipating heat from a stator lamination stack.

SUMMARY OF INVENTION

This need may be met by the subject matter according to the independent claims. Advantageous embodiments of the present invention are described by the dependent claims.

According to an embodiment, there is provided a cooling support element for a stator segment of an electrical machine, in particular a generator. The cooling support element comprises a first plate having an upper surface and a lower surface, wherein the upper surface of the first plate comprises anchoring element for anchoring a stator lamination stack being attachable to the cooling support element, a second plate having an upper surface and a lower surface, wherein the lower surface of the second plate comprises an inlet opening and an outlet opening, wherein the first plate is attached to the second plate in such a manner that the lower surface of the first plate faces the upper surface of the second plate, wherein separator elements are disposed between the lower surface of the first plate and the upper surface of the second surface such that a cooling channel is provided between the first plate and the second plate, and wherein a cooling fluid is guidable from the inlet opening through the cooling channel to the outlet opening for dissipating heat from the stator lamination stack.

This embodiment is based on the idea that a support element may be used on which a stator lamination stack may be mounted, wherein the support element also provides a cooling functionality. According to this embodiment, a simple and efficient method is introduced to support or mount a stator lamination stack and, at the same time, to cool this stator lamination stack.

The described cooling support element addresses the cooling of stator segments, e.g., the stator lamination stack and windings arranged on the stator lamination stack, and the manufacturing processes involved in the stator segment production. The cooling function presented herein may enable cooler machine performance without the need for large air to air heat exchangers. The described cooling support element may provide a stator cooling mechanism with integration to the wind turbine cooling.

The uneven flow of cooling air in common systems may cause uneven machine performance regarding temperature and may require larger fan powers to address hot spots especially in the end windings. The axial cooling channels provided in the stator stack may reduce the structural integrity of the segments, which the liquid cooling provided by the herein described cooling support element may eliminate.

The flow of the liquid through the cooling channel may be varied so that a variable flow can be arranged and hence controls can be integrated to optimize cooling depending on machine power output (with or without sensor less controls).

The described cooling support element may be used for a stator segment. The cooling channel of the cooling support element may thus be manufactured and produced with each segment and only piping connection is required during stator assembly. As cooling fluid, water or any other fluid, for instance water or a glycol mixture, may be used. A glycol mixture is preferred due to anti freeze properties at reduced operating temperatures. Based on the cooling fluid flow and with an optimized channel height and width, hence the necessary convective coefficients are generated.

"Stator lamination stack" in this context may refer to the part of the stator providing recesses for receiving windings. This part of the stator may be formed by stacking a plurality of thin pieces of silicon steel plate elements.

"Dissipating heat" in this context may denote that any heat generated within the stator segments which may occur at the end sections that may be dissipated or lead away from the end sections.

The herein described cooling support element may be used for a stator of a generator of a wind turbine. It may also be used for any other kind of electrical machine, like a motor.

According to a further embodiment, the first plate comprises sidebars being attached on two opposing edges of the lower surface, wherein the sidebars are adapted for closing the cooling channel.

The sidebars may be used for closing the cooling channel on two sides. Further, the sidebars may be used for attaching the cooling support element to an adjacent stator segment.

According to a further embodiment, T-shaped bars are attached to the lower surface of the second plate for reinforcing the cooling support element.

By using T-shaped bars, the rigid construction of segments when laminations are stacked together and the lifetime check of integrity of segments may be addressed. The T bars may be for instance welded to the lower surface of the second plate. Attaching of the T-bars to the cooling support element may have an effect in the life time of the segments as they provide enhanced stiffness to the support element and thus may extend the life time of the segments.

According to a further embodiment, the separator elements are attached to the upper surface of the second plate.

The separator elements may be, for instance, be welded to the upper surface of the second plate. The separator elements may be in the form of bars, which extends in one direction.

According to a further embodiment, the separator elements form a meander-shaped cooling channel.

By providing a meander-shaped cooling channel, the cooling fluid may enter the cooling support element at the inlet opening, which may be arranged in one corner of the second plate. Starting at this inlet opening, the cooling fluid may pass through the cooling channel in the meander form between the first and the second plate and may leave the cooling channel at the outlet opening being arranged for instance at a corner of the second plate being opposite to the first corner.

According to a further embodiment, the anchoring element comprises grooves or recesses being adapted to engage with corresponding recesses or grooves of the stator lamination stack.

Using keyway features (grooves or recesses) for anchoring the stator lamination stack, welding or bolting the stator lamination stack layers may be avoided. The layers may be inserted into the keyway features at one side of the cooling support element.

According to a further embodiment, a stator segment for a stator of an electrical machine, in particular a generator, is provided. The stator segment comprises a stator lamination stack and a cooling support element as described above.

The stator lamination stack may be attached to or mounted on the cooling support element. By the cooling support element, a support structure as well as a cooling device may be provided for the stator segment. The windings, being arranged on the stator lamination stack, may be cooled, wherein a relatively even cooling may be achieved.

According to a further embodiment, the stator segment further comprises two stator pressure plates, wherein the two stator pressure plates are arranged on two opposing axial ends of the cooling support element.

At a front face of the stator segment, a first pressure plate may be attached and at the opposing face of the stator segment a second pressure plate may be attached. The pressure plates may be used for reinforcing and in particular tightening the stator lamination stack. The pressure plates may be coupled and tightened by using a beam.

Optionally, the pressure plates can be liquid cooled and hence the end turn winding temperature can be controlled much easily if a need arises. For this, the input and output connections via the inlet and outlet openings can be made in a divider block that will stream line flows to avoid vortices and flow disruptions due to bend and sharp corners if cooling of the pressure plates is required. Else, the inlet and outlet of the flow will be underneath the cooling channel, i.e., on the lower surface of the second plate.

According to a further embodiment, the two stator pressure plates comprise each a pilot diameter for piloting the cooling support element.

The pilot diameter may be in the form of a recess for receiving and guiding the cooling support element. This may provide a better control of the tolerance requirements when the stator lamination stack is added.

According to a further embodiment, the stator lamination stack is arranged between the two pressure plates and is attached to the cooling support element.

The cooling support element may be used as stacking barrel to enable a continuous stacking which can be welded or stud joined to the pressure plates.

According to a further embodiment, the two pressure plates are connected to a divider block and are adapted to provide an end cooling of the stator segment by the divider block.

A divider block may be used for providing the cooling fluid not only to the cooling channel via the inlet opening but providing the cooling fluid in addition to the pressure plates. The pressure plates may be cooled, for instance via cooling pipelines being part of the pressure plates, and thus, a cooling of the end windings may be achieved.

According to a further embodiment, a stator of an electrical machine, in particular a generator, is provided. The stator comprises at least two stator segments as described above.

The stator may comprise more than two stator segments. Each stator segment may comprise one cooling support element.

According to a further embodiment, an electrical machine, in particular a generator for a wind turbine, is provided. The electrical machine comprises a rotor and a stator as described above.

Such an electrical machine or generator may be any kind of electrical machine or generator being known in the art. The rotor and the stator may be arranged in a common way, wherein the stator may comprise stator segments with cooling support elements according to embodiments as described herein.

It should be understood that features (individually or in any combination) disclosed, described, used for or mentioned in respect to the description of an embodiment of a cooling support element, a stator segment, a stator or an electrical machine may also be (individually or in any combination) applied, used for, or employed for a method for manufacturing a cooling support element.

According to a further embodiment, a method for manufacturing a cooling support element, for a stator segment for a stator of an electrical machine, in particular a generator, is provided. The method comprises providing a first plate having an upper surface and a lower surface, wherein the upper surface of the first plate comprises anchoring element for anchoring a stator lamination stack being attachable to the cooling support element, providing a second plate having an upper surface and a lower surface, wherein the lower surface of the second plate comprises an inlet opening and an outlet opening, attaching the first plate to the second plate such that the lower surface of the first plate faces the upper surface of the second plate, and disposing separator elements between the lower surface of the first plate and the upper surface of the second surface such that a cooling channel is provided between the first plate and the second plate, wherein a cooling fluid is guidable from the inlet opening through the cooling channel to the outlet opening for dissipating heat from the stator lamination stack.

"Attaching" in this context may refer to welding or fixing with any kind of fixation means like bolts, or keyway features.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

Embodiments of the present invention are now described with reference to the accompanying drawings to which the invention is not limited.

FIG. 3 illustrates a second plate of the cooling support element according to an embodiment;

FIG. 4 illustrates a cooling support element according to a further embodiment;

FIG. 9 illustrates another view of the stator segment of FIG. 8;

FIG. 10 illustrates an enlarged view of the stator segment of FIGS. 8 and 9;

FIG. 11 illustrates a flow of the cooling fluid within the cooling support element according to an embodiment;

DETAILED DESCRIPTION OF INVENTION

Figure 1:
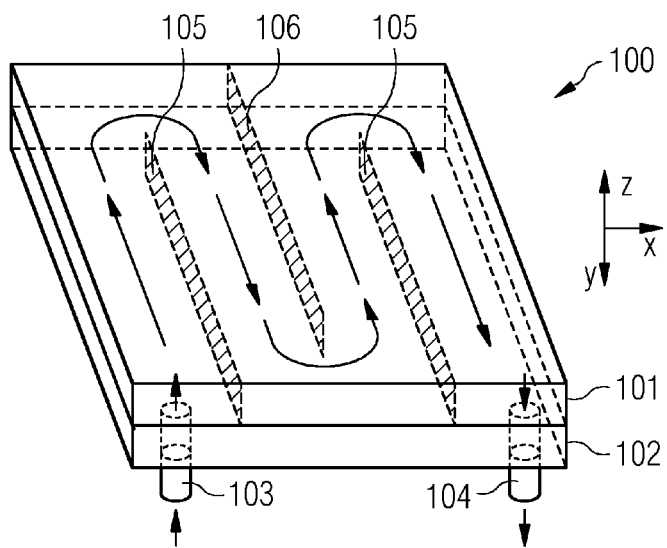
FIG. 1 illustrates a cooling support element according to an embodiment.

The illustration in the drawings is in schematic form. It is noted that in different figures, similar or identical elements are provided with the same reference signs.

FIG. 1 illustrates a cooling support element 100 according to an embodiment. The cooling support element 100 can be used for a stator segment for a stator of an electrical machine, in particular a generator.

The cooling support element 100 comprises a first plate 101. The first plate 101 has an upper surface and a lower surface, wherein the upper surface of the first plate comprises anchoring element for anchoring a stator lamination stack being attachable to the cooling support element 100. The cooling support element may serve as a support structure for the stator lamination stack and at the same time as a cooling device for the stator lamination stack, in particular for winding being arranged in the stator lamination stack.

The cooling support element 100 comprises a second plate 102 having an upper surface and a lower surface. The lower surface of the second plate comprises an inlet opening 103 and an outlet opening 104.

The first plate 101 is attached to the second plate 1 in such a manner that the lower surface of the first plate 101 faces the upper surface of the second plate 102. Separator elements 105, 106 are disposed between the lower surface of the first plate 101 and the upper surface of the second surface 102 such that a cooling channel is provided between the first plate 101 and the second plate 102. In one configuration, as shown here, a part of the separator elements 105 abuts on one edge of the cooling support element and a part of the separate elements 106 abuts on the opposing edge of the cooling support element. A cooling fluid can be guided or pass from the inlet opening 103 through the cooling channel to the outlet opening 104 for dissipating heat from the stator lamination stack.

Stator segments are provided with a cooling channel specially designed and optimized. The channel is manufactured and produced with each segment and only piping connection is required during stator assembly. The channels may be provided with water/glycol mixture flow and with an optimized channel height and width such that the necessary convective coefficients are generated. The input and output connections can be made in a divider block that will stream line flows to avoid vortices and flow disruptions due to bend and sharp corners if cooling of pressure plates is required. Else, the inlet and outlet of the flow will be underneath the cooling channels as shown in FIG. 1. The cooling support element are also used as stacking barrel to enable a continuous stacking which can be welded or stud joined to the pressure plates. A required stacking pressure can be used during the stacking process. Bars underneath the stacking may be used to make the cooling channel profile which can be optimized based on further considerations, for instance simulations. Since several bends and turns are involved, a deeper understanding of the flow trajectories may be achieved by the following figures.

In the following, a possible manufacturing method will be described. However, it should be noted that also other methods may be used for manufacturing the herein described cooling support element.

Figure 2:
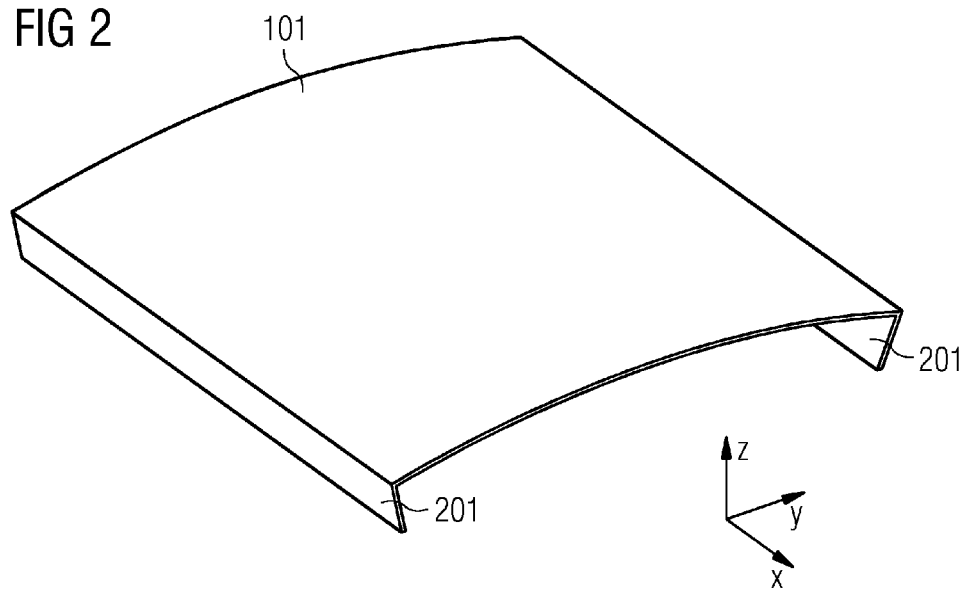
FIG. 2 illustrates a first plate of the cooling support element according to an embodiment.

The exemplary assembly process starts in FIG. 2 with a rolled plate 101 that will form the upper part of the cooling support element. This first plate 101 will later form the stacking barrel that will be used during stator stacking and assembly. Thin bars 201 are welded at the ends of the upper cooling plate 101 to enclose a flow channel. The upper cooling plate may be a rolled sheet metal. The side bars 201 may act as side bars later for stator segment to stator segment connection and also for closing the cooling channel to be formed by the upper and lower plates. The first plate may have keyways cut on top of it after rolling and welding for anchoring the stator assembly in the radial and tangential direction. The keyways 401 are shown in FIG. 4.

The lower plate 102 for the cooling support element 100 may also be a rolled sheet metal as shown in FIG. 3. However, the lower part of the cooling channel can be a complete plate for resistance welding or a number of plates for arc welding. Port connections 102, 103 will be welded to the lower side of the plate for inlet and outlet of coolant. The distinct flow separators 105, 105 will be welded on top of the lower plate. These unique separators will be reversing and directing flow as will be shown later.

Figure 5:
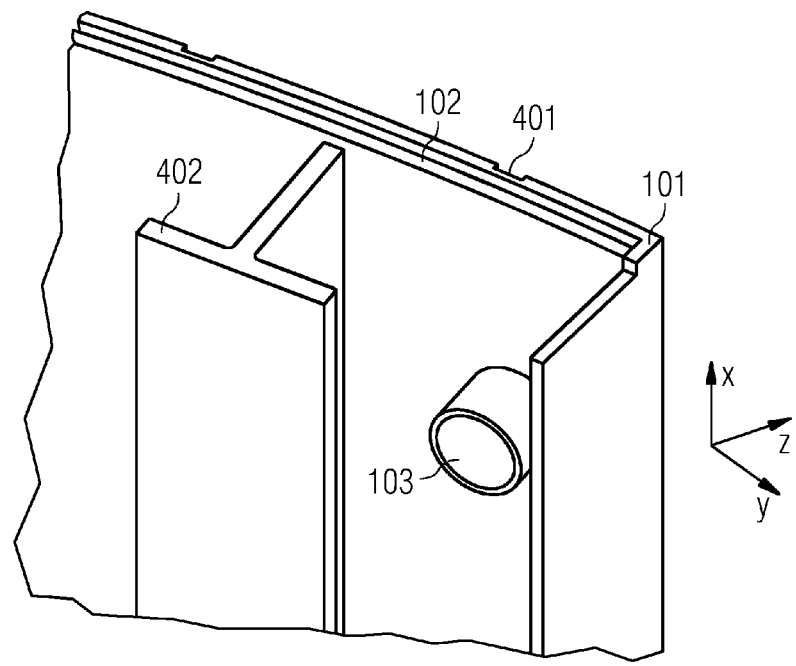
FIG. 5 illustrates an enlarged part of the cooling support element of FIG. 4.
Figure 6:
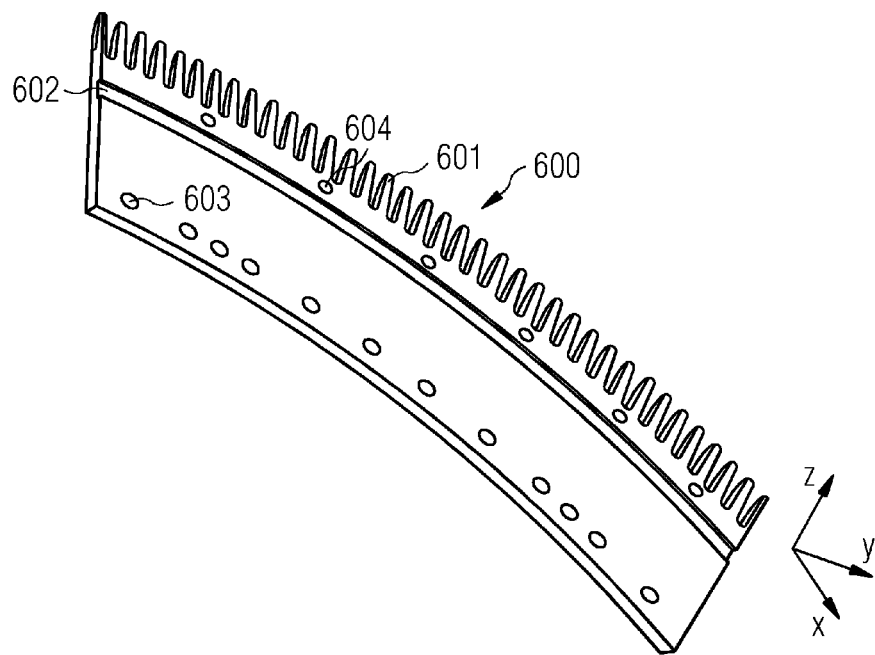
FIG. 6 illustrates a pressure plate according to an embodiment.

T-bars 402 may be welded underneath the lower part 102 of the cooling support element to give the necessary strength to the stator assembly. The final assembly 400, 500 as shown in FIGS. 4 and 5 has a cooling channel with drive end and non drive end open. The first plate 101 and the second plate 102 will be welded around to form the cooling channel. The cooling support element as shown in FIG. 4 can be used as a stacking barrel for the stator stacking process.

The stacking process of the lamination will start with one pressure plate 600 placed and the cooling support element welded to the pressure plate. This will ensure a perpendicular stacking point for the assembly. The pressure plates can be formed from steel plates or any equivalent material. In addition, the pressure plates comprise a pilot diameter 602 which is machined into the plates for piloting the stacking barrel. The piloting will enable better control of the tolerance stack ups and also play part in structural linking of the stator segments.

The pressure plates comprise fingers or teeth for the windings. Further, they comprise holes 602, 603 for fixing the cooling support element and for coupling the two pressure plates together by a beam 1010 as shown in FIG. 10, which illustrates an enlarged view of the cooling support element 1000.

Figure 7:
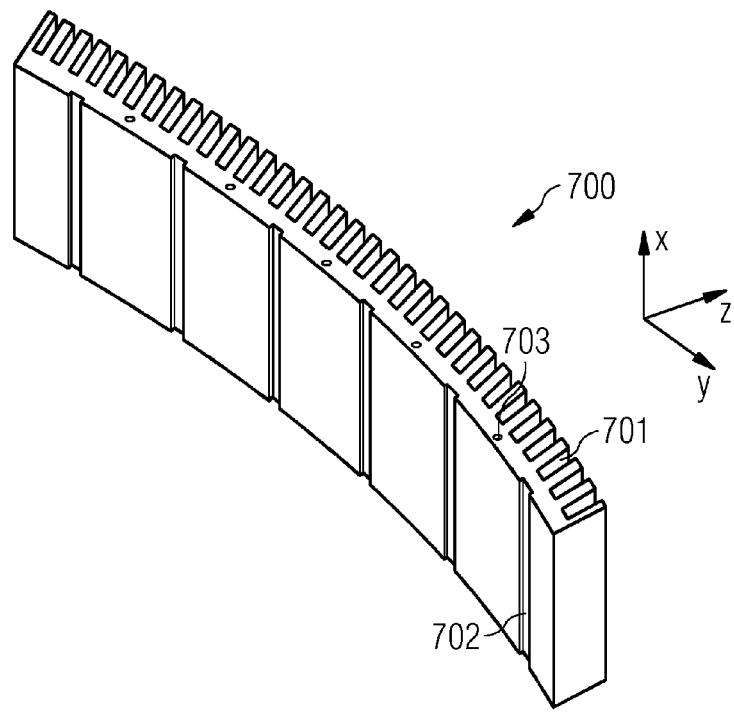
FIG. 7 illustrates a stator lamination stack according to an embodiment.

The laminations will be stacked and in between stacking, a stacking pressure is applied to ensure higher stacking coefficient. The laminations are to be manufactured with stud holes 703 and/or dove tailed keyways 702 as shown in FIG. 7. If the laminations are made with a stacking bolt holes, long studs are used to guide the stacking and the final tightening of the laminations can be made and the stacking pressure controlled even during production. If the laminations are made with dovetail keys, the upper cooling channel will be made with a dovetailed keyway feature that will be used to locate the segments in place in the radial direction.

FIG. 7 shows the lamination stack 700 isolated. The individual laminations are punched with stud holes and keyway or keys in the inner diameter. The key features will be used to anchor the laminations in the cooling channel and will give better control on the radial direction as opposed to welding. The stator lamination stack 700 further provides teeth or fingers for the windings to be arranged on the stack.

Figure 8:
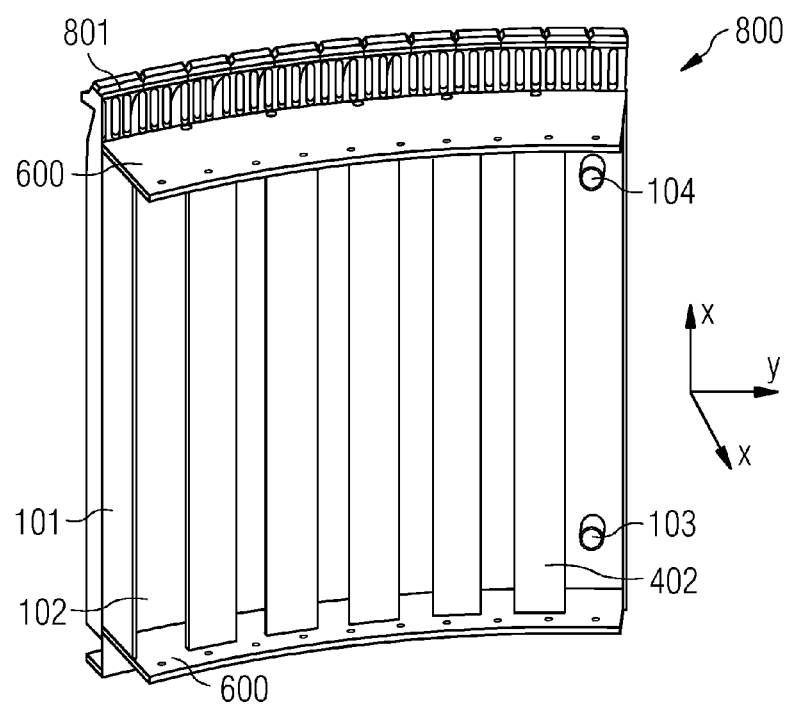
FIG. 8 illustrates a stator segment according to an embodiment.

The final stator segment 800, 900 as shown in FIGS. 8 and 9 further comprises end windings 801 and windings 900 being arranged on the stack. The cooling channel underneath the stack provides cooling for the windings and the stack itself.

For the stud connected lamination stacks, the final tightening and stacking pressure control can be made while the keyed lamination stacks will have to use a hydraulic press to control the stacking pressure. For both cases, the number of stud holes and keys will be determined from the strength requirement. The above methods can be used together to ensure a rigid segment construction that will stand the lifetime of a wind turbine. The aligned stack assembly will have a cooling inlet, channel and outlet formed with the rolled plates, T bars, and pressure plates. The subsequent winding can then be started. An optional divider block can be extended to the pressure plates with the idea of cooling the ends of the stator assembly for the cooling of the end windings.

The described cooling support element enables a tight assembly of stator segments due to the construction and the requirement of liquid cooling which are always more compact and easy to operate. The stacking process may ensure rigid assembly process and continuous monitoring of stacking pressure during lifetime in some cases if bolt holes are provided. The process may further ensure that the radial deflection of the stator laminations can be kept very minimal due to the provided radial constraints in studs and key features. The liquid cooling by itself may enable cooler machine performance due to higher convective coefficient of the liquid flow. The liquid cooling may only require a radiator station (1201 in FIG. 12) and a pumping station (1204-1207 in FIG. 12) which would consume less energy than distributed air to air heat exchangers. The cold start up of the machine may be possible when the cooling medium, water, is added with glycol as an anti freeze. A substantial weight decrease is expected due to compact nature of the cooling arrangement. An optimized end flow can enable cooler end windings and hence greater lifetime of insulations.

The cooling support element has benefits of a cooler machine performance due to the high convective coefficient of liquid coolants. The cooling requirements by a liquid radiator are much less than and the pumping power required will be less and hence the overall system efficiency of the generator will increase. The lifetimes of the insulations and groundings may be increased due the cooler machine performance. The flow controls in the pumping stations and valve arrangements may enable variable power point operation and hence may save efficiency at lower power outputs. With liquid cooling, a generator can be designed as a TEWAC (totally enclosed water to air cooled) generator with an IP54 or more rating whereby it can withstand harsh environments such as salty fogs, dusty areas, etc.

The cooling support element may also enable the rigid construction of the stator segments with the provided key features and studs. This may enable compact construction of the stator stack, accurate alignment to keep the OD of the stator stack and may increase the lifetime of the generator by removing a number of weld points from the hotspot of the loaded parts. It may also enable to keep track of the loss in stacking pressure of the segments by retightening the bolts with strain indicators during service and lifetime maintenance. The cooling support element may also serve as the stacking barrel in the lamination stacking process and also enable a sturdy construction on which the lamination stacks can be put on.

A coolant flow 1100 in the cooling channel may be seen in FIG. 11. A typical coolant trajectory is illustrated by the arrows within the cooling channel. In an example, the flow is at 2.5 liters/second. The flow is assumed to generate an equivalent convective coefficient of 3500 W/m2K with an optimized coolant height and width. The open spots in the flow (where the flow bends and aligns) can be remedied with a more refined flow analysis and flow guides inside the channel. Vortex generators can also be assembled into the channel assembly if any requirements in increasing the convective coefficient are required. A very low temperature increase in the range of 2° C. to 4° C. is expected between inlet and outlet flow of each segments. The radiator that will be used may be sized according to worst case efficiency of machine.

Figure 12:
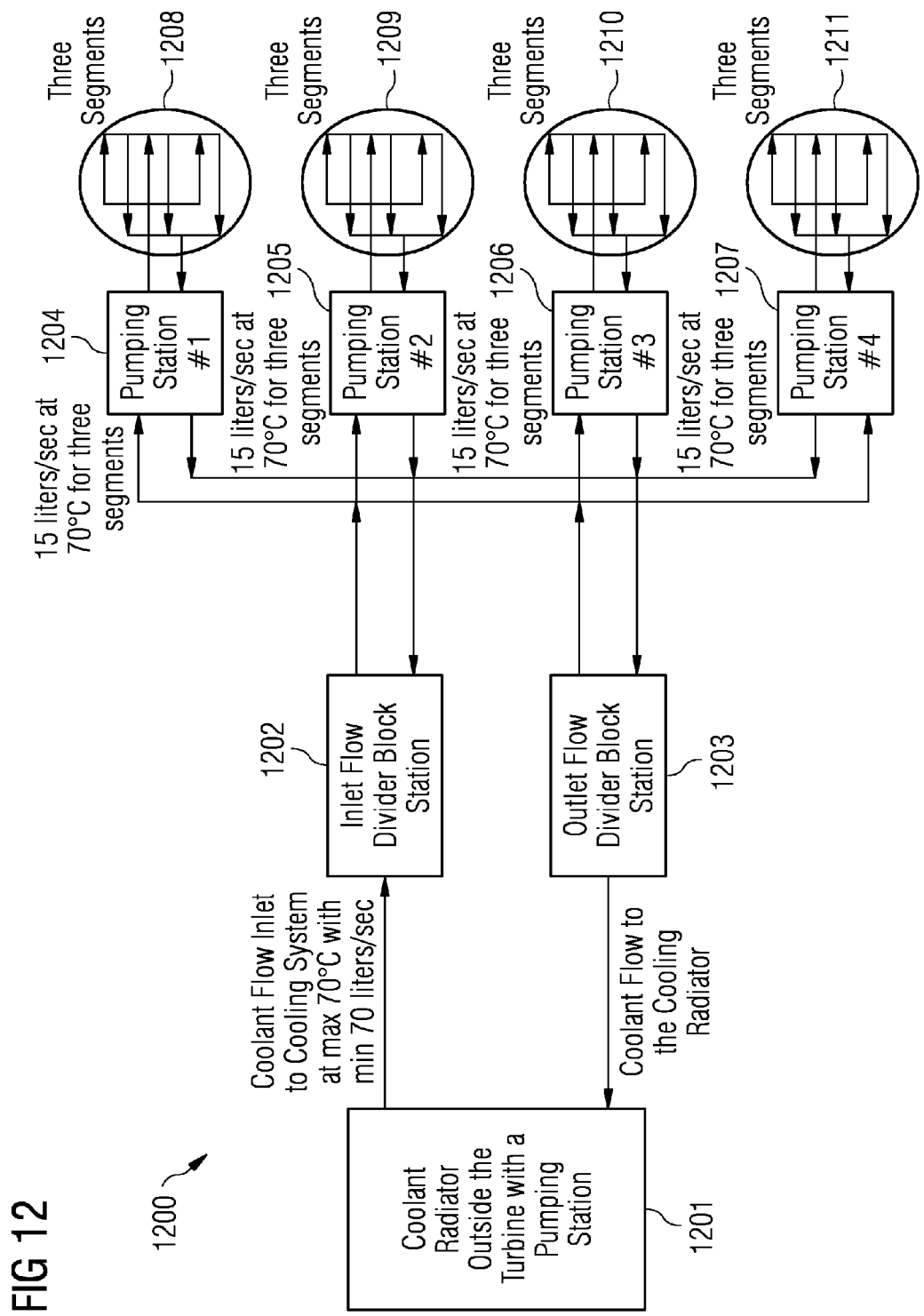
FIG. 12 illustrates a cooling diagram according to a further embodiment.

As shown in the diagram 1200 of FIG. 12, a coolant radiator 1201 outside the turbine has a pumping station. The radiator 1201 is coupled to an inlet flow divider block station 1202 and an outlet flow divider block station 1203.

The radiator provides a coolant flow inlet to the divider block station 1202 and receives a coolant flow from the divider block station 1203. Both divider block stations are coupled to a plurality of pumping stations 1204-1207. Each pumping station can provide three segments 1208-1211 with the cooling fluid. Each of the respective segments is arranged as the stator segment as described above. Thus, a plurality of segments can be controlled by one coolant radiator 1201.

According to the herein described embodiments, a mechanism and manufacturing method for liquid cooled stator segment and assembly of a permanent magnet electric machine especially for wind turbine application may be achieved.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A cooling support element for a stator segment of a stator of an electrical machine, comprising:
   a first plate having a first outer surface and a first inner surface, wherein the first outer surface comprises anchoring element for anchoring a stator lamination stack being attachable to the cooling support element;
   a separate second plate having a second outer surface and a second inner surface, wherein the second inner surface comprises an inlet opening and an outlet opening; and
   a plurality of separator elements disposed between the first inner surface and the second router surface for providing a cooling channel,
   wherein the first plate is attached to the second plate so that the first inner surface faces the second router surface, and
   wherein a cooling fluid is guided from the inlet opening through the cooling channel to the outlet opening for dissipating heat from the stator lamination stack.

2. The cooling support element as claimed in claim 1, wherein the first plate comprises sidebars being attached on two opposing edges of the first inner surface, and wherein the sidebars are adapted for closing the cooling channel.

3. The cooling support element as claimed in claim 1, further comprising a plurality of T-shaped bars attached to the second inner surface for reinforcing the cooling support element.

4. The cooling support element as claimed in claim 1, wherein the separator elements are attached to the second router surface.

5. The cooling support element as claimed in claim 1, wherein the cooling channel is a meander-shaped cooling channel.

6. The cooling support element as claimed in claim 1, wherein the anchoring element comprises grooves or recesses being adapted to engage with corresponding recesses or grooves of the stator lamination stack.

7. The cooling support element as claimed in claim 1, wherein the electrical machine comprises a generator for a wind turbine.

8. A stator segment for a stator of an electrical machine, comprising:
   a cooling support element as claimed in claim 1; and
   a stator lamination stack being attachable to the cooling support element.

9. The stator segment as claimed in claim 8, further comprising two stator pressure plates being arranged on two opposing axial ends of the cooling support element.

10. The stator segment as claimed in claim 9, wherein the two stator pressure plates each comprises a pilot diameter for piloting the cooling support element.

11. The stator segment as claimed in claim 9, wherein the stator lamination stack is arranged between the two pressure plates and is attached to the cooling support element.

12. The stator segment as claimed in claim 9, wherein the two pressure plates are connected to a divider block station and are adapted to provide an end cooling of the stator segment by the divider block station.

13. A method for manufacturing a cooling support element for a stator segment of a stator of an electrical machine, comprising:
   providing a first plate having a first router surface and a first inner surface, wherein the first router surface comprises anchoring element for anchoring a stator lamination stack being attached to the cooling support element;
   providing a second plate having a second router surface and a second inner surface, wherein the second inner surface comprises an inlet opening and an outlet opening;
   attaching the first plate to the second plate so that the first surface faces the second router surface;
   disposing a plurality of separator elements between the first inner surface and the second router surface for providing a cooling channel; and
   guiding a cooling fluid from the inlet opening through the cooling channel to the outlet opening for dissipating heat from the stator lamination stack.

* * * * *